(12) United States Patent
Jl et al.

(10) Patent No.: US 8,824,354 B2
(45) Date of Patent: Sep. 2, 2014

(54) COMMUNICATION SYSTEM WITH RELAYS AND COMMUNICATION THEREIN VIA MULTI-CARRIERS

(75) Inventors: Hyoung Ju Jl, Seoul (KR); Joon Young Cho, Gyeonggi-do (KR); Young Bum Kim, Seoul (KR); Ju Ho Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 218 days.

(21) Appl. No.: 13/348,159

(22) Filed: Jan. 11, 2012

(65) Prior Publication Data
US 2012/0176956 A1 Jul. 12, 2012

(30) Foreign Application Priority Data

Jan. 11, 2011 (KR) .......................... 10-2011-0002692

(51) Int. Cl.
*H04L 29/06* (2006.01)
(52) U.S. Cl.
USPC .......................................... 370/315; 370/465
(58) Field of Classification Search
CPC ..... H04B 7/2606; H04W 88/04; H04L 29/06; H04L 47/10
USPC .................................................. 370/315, 465
See application file for complete search history.

*Primary Examiner* — Ronald Ableson
(74) *Attorney, Agent, or Firm* — The Farrell Law Firm, P.C.

(57) ABSTRACT

A system and method for transmitting multi-carriers in a wireless communication system with a relay are provided. The method includes configuring each of downlink carriers that form the multi-carriers as at least one normal sub-frame and at least one backhaul sub-frame; determining one of the downlink carriers that has a maximum number of backhaul sub-frames, as a primary carrier, and other downlink carriers as sub-carriers; and altering a backhaul sub-frame into a normal sub-carrier in the sub-carrier, in response to a normal sub-frame of the primary carrier.

16 Claims, 12 Drawing Sheets

FIG. 4
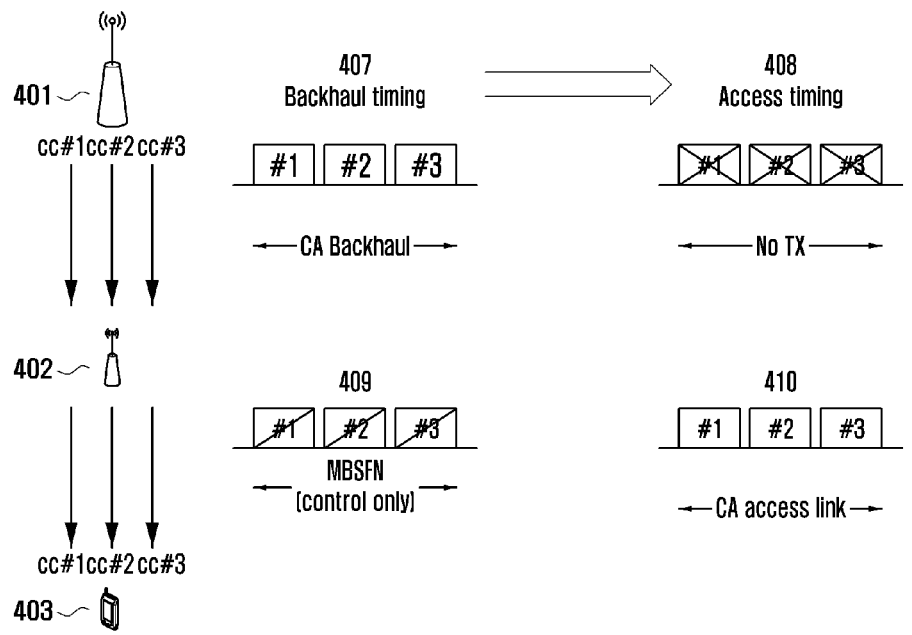
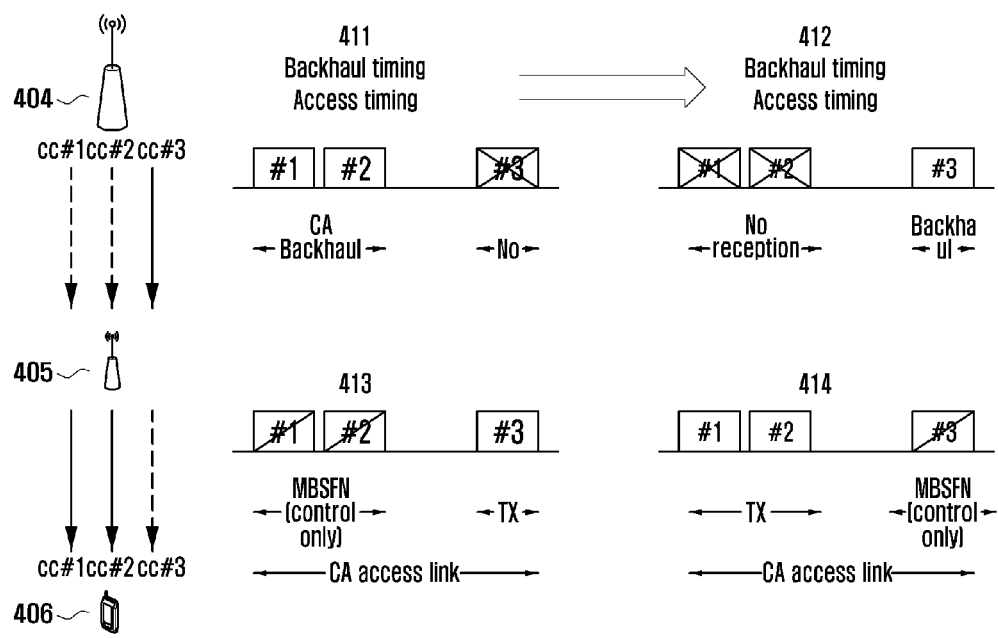

COMMUNICATION SYSTEM WITH RELAYS AND COMMUNICATION THEREIN VIA MULTI-CARRIERS

PRIORITY

This application claims priority under 35 U.S.C. §119(a) to Korean Patent Application No. 10-2011-0002692, which was filed in the Korean Intellectual Property Office on Jan. 11, 2011, the entire content of which is incorporated herein by reference.

BACKGROUND OF THE INVENTION

1. Field of the Invention

This invention generally relates to a system and method that transmits channel data, and more particularly, to a system and method that transmits data via a multi-carrier backhaul, from a relay of an Orthogonal Frequency Division Multiplexing (OFDM) relay communication system using multi-carriers.

2. Description of the Related Art

Orthogonal Frequency Division Multiplexing (OFDM) is a method of transmitting data via multiple carriers. OFDM is a form of Multi-Carrier Modulation (MCM) that divides a serial symbol stream into parallel symbol streams, modulates the parallel symbol streams into sub-carrier channels that are orthogonal to each other, and then transmits the modulated streams.

The first systems using MCM were military high frequency radio links developed in the late 1950s. OFDM, overlapping a number of orthogonal sub-carriers, has been developed since the 1970s. Since it was difficult to implement OFDM with orthogonal modulation between multi-carriers, OFDM could not easily be applied to a real system. In 1971, Weinstein, et al. proposed that modulation-demodulation using OFDM can be efficiently achieved via Discrete Fourier Transform (DFT), which led to the rapid development of systems employing OFDM. Since a method is reported that uses a guard interval and inserts a Cyclic Prefix (CP) in the guard interval, OFDM can reduce the negative affects to the system, such as a multipath and a delay spread.

With the development of related technologies, OFDM can now be applied to digital transmission technology, such as Digital Audio Broadcasting (DAB), Digital Video Broadcasting (DVB), Wireless Local Area Network (WLAN), Wireless Asynchronous Transfer Mode (WATM), etc. OFDM was not previously applied to such systems due to the hardware complexity until digital signal process technology, such as Fast Fourier Transform (FFT), Inverse Fast Fourier Transform (IFFT), etc., was developed.

OFDM is similar to Frequency Division Multiplexing (FDM). In particular, OFDM can transmit data while retaining the orthogonality among a number of tones, and this can lead to optimal transmission efficiency during the transmission of data at a high speed. Since OFDM has a high efficiency of frequency use and efficiently deals with the multi-path fading, it can also achieve optimal transmission efficiency during the transmission of data at a high speed.

OFDM is also advantageous in that, since OFDM overlaps frequency spectra, OFDM has a high efficiency of frequency use, can deal with frequency selective fading and multi-path fading, can reduce Inter Symbol Interference (ISI) using guard intervals, allows for a simple design of equalizer in hardware, and can counteract impulse noise. These advantages make OFDM able to be applied to communication systems.

In wireless communication, the primary factors for the deterioration of a high speed of data transmission and a high quality of data service are from a channel environment. Channel environment in wireless communication is frequently subject to Additive White Gaussian Noise (AWGN), the variation of received signal strength by fading, Doppler's effect caused by the movement of user equipment and the change in movement speed, interference by multi-path signals or the other users' devices, etc. Therefore, the causes affecting channel environment need to be processed in order to achieve a high speed of data transmission and a high quality of data service in wireless communication.

In OFDM, modulation signals are expressed in two-dimensional resources of time and frequency. The time axis resources include different OFDM symbols that are orthogonal each other. Likewise, the frequency axis resources include different tones that are orthogonal each other. For example, if an OFDM symbol is set over a time axis and a tone is also set over a frequency axis, one minimum unit resource can be set, which is hereinafter referred to as a Resource Element (RE). Although different REs pass through a frequency selective channel, they still have orthogonality. Therefore, signals transmitted via different REs can be transmitted to the receiver, without interference.

Physical layer channels (i.e., physical channels) are used to transmit modulation symbols created as one or more encoded bit streams are modulated. An Orthogonal Frequency Division Multiple Access (OFDMA) system configures a number of physical channels according to the use of data stream that will be transmitted or the types of receivers, and then performs data transmission. Arranging one physical channel to an RE and transmitting data via the channel need to be set between a transmitter and a receiver, the process of which is called 'mapping.'

SUMMARY OF THE INVENTION

The present invention has been made in view of the above problems, and provides a system and method that allow a relay to perform channel transmission in multi-carrier backhaul sub-frames, thereby performing an efficient uplink link channel transmission, created cross scheduling between carriers when performing relay backhaul transmission via multi-carriers, and reducing the waste of resources.

In accordance with an embodiment of the invention, a method performed by a base station for communicating via multi-carriers is provided. The method includes configuring each of downlink carriers that form the multi-carriers as at least one normal sub-frame and at least one backhaul sub-frame; determining one of the downlink carriers that has a maximum number of backhaul sub-frames, as a primary carrier, and other downlink carriers as sub-carriers; and altering a backhaul sub-frame into a normal sub-carrier in the sub-carrier, in response to a normal sub-frame of the primary carrier.

In accordance with another embodiment of the invention, a method performed a relay for communicating via multi-carriers is provided. The method includes determining one of downlink carriers as a primary carrier, and other downlink carriers as sub-carriers, where the downlink carriers form the multi-carriers and each downlink carrier is configured as at least one normal sub-frame and at least one backhaul sub-frame; selecting, when a backhaul sub-frame is configured in the downlink carriers, one of uplink carriers as a reply carrier, and transmitting control information that is created in response to the backhaul sub-frame, wherein the primary carrier has a maximum number of backhaul sub-frames in the downlink carriers, and the sub-carriers are configured as a subset of the primary carrier where normal sub-frames are arranged in response to the at least one normal sub-frame of the primary carrier.

In accordance with another embodiment of the invention, a base station for communicating via multi-carriers is provided. The base station includes a transmitter for transmitting signals via the multi-carriers of downlink carriers; a configuring unit for configuring each of the downlink carriers as at least one normal sub-frame and at least one backhaul sub-frame; and a controller for determining one of the downlink carriers that has a maximum number of backhaul sub-frames, as a primary carrier, and other downlink carriers as sub-carriers, and for altering a backhaul sub-frame into a normal sub-carrier in the sub-carrier, in response to a normal sub-frame of the primary carrier.

In accordance with another embodiment of the invention, a relay for communicating via multi-carriers is provided. The relay includes a receiver for receiving signals via downlink carriers that form the multi-carriers, where each downlink carrier is configured as at least one normal sub-frame and at least one backhaul sub-frame; a controller for determining one of the downlink carriers as a primary carrier and the others as sub-carriers, and for selecting one of uplink carriers as a reply carrier in response to respective downlink carriers; and a transmitter for transmitting control information that is created in response to the backhaul sub-frame, via the reply carrier, under the control of the controller, wherein, the primary carrier has a maximum number of backhaul sub-frames in the downlink carriers, and the sub-carriers is configured as a subset of the primary carrier where normal sub-frames are arranged in response to the normal sub-frame of the primary carrier.

BRIEF DESCRIPTION OF THE DRAWINGS

The features and advantages of the invention will become more apparent from the following detailed description in conjunction with the accompanying drawings, in which:

FIG. 4 is a diagram illustrating a carrier scenario of a multi-carrier relay system according to an embodiment of the present invention;

DETAILED DESCRIPTION OF EMBODIMENTS OF THE PRESENT INVENTION

Hereinafter, embodiments of the present invention are described in detail with reference to the accompanying drawings. The same reference numbers may be used throughout the drawings to refer to the same or similar parts. Detailed descriptions of well-known functions and structures incorporated herein may be omitted to avoid obscuring the subject matter of the present invention.

The terms or words described in the following description and the claims are not merely limited to a general or lexical meaning, but instead are defined according to usage in the following description, in compliance with embodiments of the present invention. One skilled in the art will also understand that the following embodiments described with reference to the accompanying drawings are merely provided as examples, and there may be various modifications, alterations, and equivalents thereof to replace the described embodiments in accordance with the present invention.

Although the following embodiments of the present invention are described based on a Long Term Evolution (LTE) system and an LTE-advanced (LTE-A) system, it should be understood that the invention is not limited to such embodiments. For example, the invention can also be applied to other wireless communication systems that are operating according to scheduling of base stations.

Herein, LTE systems refer to systems that employ OFDM in a downlink and Single Carrier Frequency Division Multiple Access (SC-FDMA) in an uplink. LTE-Advanced (LTE-A) systems refer to LTE systems expanded in multiple bands. Relays are applied to LTE systems.

Sub-frames of LTE systems have a length of 1 ms over the time axis and span the entire LTE transmission bandwidth over the frequency axis, and also have two different slots over the time axis. The LTE transmission bandwidth includes a number of Resource Blocks (RBs), each used as a basic unit of allocating a resource. Each RB includes 12 tones arranged over the frequency axis and 14 OFDM symbols arranged over the time axis. A sub-frame includes a control channel region for transmitting control channel data, and a data channel region for transmitting data via a data channel. A Reference Signal (RS), which is used for estimating a channel, is inserted into the control channel region and the data channel region.

A control channel region transmitted to a general user equipment is located at the front in one sub-frame over the time axis. That is, a control channel region is located over L OFDM symbols located at the front of a sub-frame, where L is 1, 2, or 3. If a sub-frame is a Multi-Media Broadcast over a Single Frequency Network (MBSFN) sub-frame, L is 2. MBSFN refers to a channel for transmitting broadcasting information. User equipment can receive data in a control channel region of a corresponding sub-frame but doesn't receive data in a data channel region.

Recent research on LTE technology has been focused on LTE-A systems.

Figure 1:
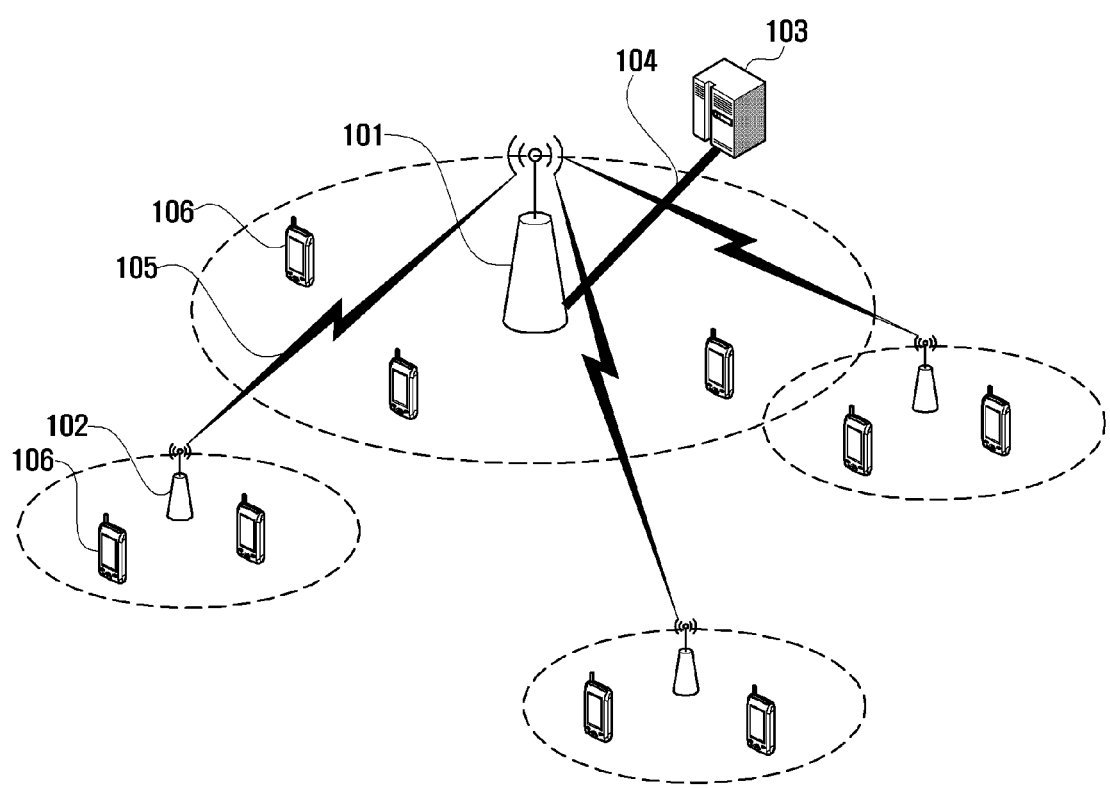
FIG. 1 is a diagram illustrating a configuration of a relay system according to an embodiment of the present invention.

FIG. 1 is a diagram illustrating a configuration of a relay system according to an embodiment of the present invention.

Referring to FIG. 1, a wireless relay system according to an embodiment of the present invention includes a wireless backhaul 105 that wirelessly connects a relay 102 and a base station 101 via a link 104 when the relay 102 and the base station 101 are operated. User equipment 106 recognizes the base station 101 and the relay 102 as the same base station. The difference between a relay and a base station is distinguished as to whether a server 103 that will transmit data to user equipment is connected to the user equipment via a wired backhaul 104 or a wireless backhaul 105.

Figure 2:
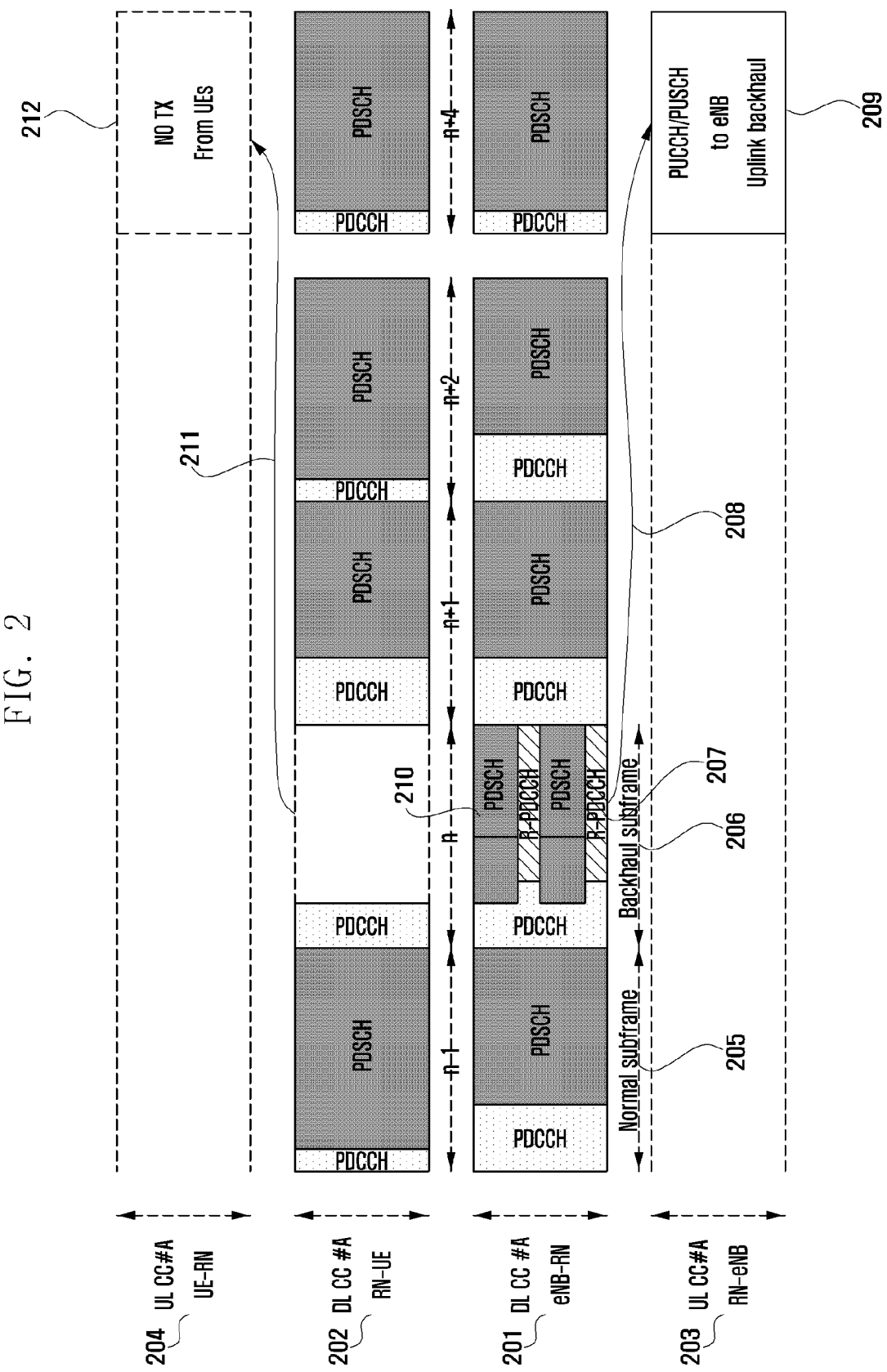
FIG. 2 is a diagram illustrating transmission and reception sub-frames in a relay system according to an embodiment of the present invention.

FIG. 2 is a diagram illustrating transmission and reception sub-frames between a base station and a relay and between a relay and user equipment, in an LTE-A system, according to an embodiment of the present invention.

Referring to FIG. 2, Reference number 201 represents a carrier through which a base station transmits downlink data to a relay or a user equipment in the coverage of the base station. Reference number 202 represents a carrier through which a relay transmits downlink data to user equipment in the coverage of the relay. Reference number 203 represents a carrier through which user equipment transmits uplink data to a relay or a base station covering the user equipment. Reference number 204 represents a carrier through which user equipment transmits uplink data to a relay covering the user equipment. Carriers 201 and 202 are transmitted through a shared physical link, while carriers 203 and 204 are transmitted through another shared physical link. The base station and the relay use the same frequency resource in the uplink and downlink data transmission.

The base station configures a normal downlink sub-frame 205 that can schedule only user equipment. The base station also configures a back-haul sub-frame 206 that can schedule both user equipment and a relay. The base station informs the relay of the configured sub-frames. In the backhaul sub-frame 206, the relay receives data via a control channel 207 and a data channel 210. The reply in response to the received channel data is transmitted via an uplink carrier 203 of the $(n+4)^{th}$ sub-frame. Since the backhaul sub-frame of an uplink is created at the time of uplink transmission by the relay according to the configuration of a downlink backhaul sub-frame, the base station does not provide the information regarding the backhaul configuration for a particular uplink.

Since the relay receives data from a base station in the $n^{th}$ downlink backhaul sub-frame 206, the relay cannot act as a transmitter. Therefore, the relay cannot transmit a downlink carrier 202 in the $n^{th}$ sub-frame. Therefore, the relay informs the user equipment that the sub-frame will be used for another purpose and data will not be transmitted. The relay does not transmit downlink scheduling information and uplink scheduling information, so that all of the user equipment connected to the relay does not transmit information in the uplink period of time, 212. In time period 202, the relay performs a transmission operation of an uplink channel in response to the scheduling information from the base station. Therefore, during the time period 202, the relay transmits, to the base station, a sub-frame that user equipment connected to the relay does not use. If the frequencies of carriers between the uplink and downlink, due to internal interference, are similar to each other, the relay cannot simultaneously perform transmission and reception operations. Therefore, the above-described process enables the transmission and reception of the relay.

A method for informing user equipment of a backhaul sub-frame configuration according to embodiments of the present invention may be differently configured according to the structure of types of sub-frames in LTE, for example, two types. In the case of two types, regarding a type 1 configured as a Frequency Division Duplex (FDD) system, 8-bit upper signaling information is transmitted so a corresponding bit indicates a sub-frame used for backhaul transmission.

Regarding a Time Division Duplex (TDD) system, part of the configurations supported by LTE, applicable to a relay, is provided with only limited support, and the configuration index is transmitted as upper signaling information. In addition, a method for configuring a relay control channel used for upper signaling information according to embodiments of the present invention may be an interleaving method that uses a type of RS, an index of potentially used resources, etc. The following Table 1 shows configuration indexes used in a TDD system:

TABLE 1

| Subframe-Configuration TDD | eNB-RN uplink-downlink configuration | Subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | | | | D | | | | U | | |
| 1 | | | | U | | D | | | | | D |
| 2 | | | | | D | | | | U | D | |
| 3 | | | | U | D | | | | | | D |
| 4 | | | | U | D | | | | | U | D |
| 5 | 2 | U | | | | | | | | D | |
| 6 | | | | | D | | | U | | | |
| 7 | | | | U | | D | | | | D | |
| 8 | | | | | D | | | | U | | D |
| 9 | | | | U | D | D | | | | D | |
| 10 | | | | | D | | | | U | D | D |
| 11 | 3 | | | | U | | | | D | | D |
| 12 | | | | | U | | | | D | D | D |
| 13 | 4 | | | | U | | | | | | D |
| 14 | | | | | U | | | | D | | D |
| 15 | | | | | U | | | | | D | D |
| 16 | | | | | U | | | | D | D | D |
| 17 | | | | | U | D | | | D | D | D |
| 18 | 6 | | | | | U | | | | | D |

Wireless technology regarding transmission and reception of multiple carriers uses a number of carriers via links between a base station and user equipment in order to transmit/receive data in a wide range of bandwidth. An LTE system can perform transmission/reception of data channels using a maximum of 5 carriers, wherein a cross-carrier scheduling between the carriers is designed in such a way that control channel date is transmitted via one carrier and only data via a data channel is transmitted via another carrier. Data via a data channel may be transmitted via all carriers in a downlink, and via one carrier in an uplink. This manner of transmission reduces Peak to Average Power Ratio (PAPR) in an uplink. Therefore, the LTE system according to embodiments of the present invention can define a relationship between uplink and downlink carriers as shown in FIG. 3.

Figure 3:
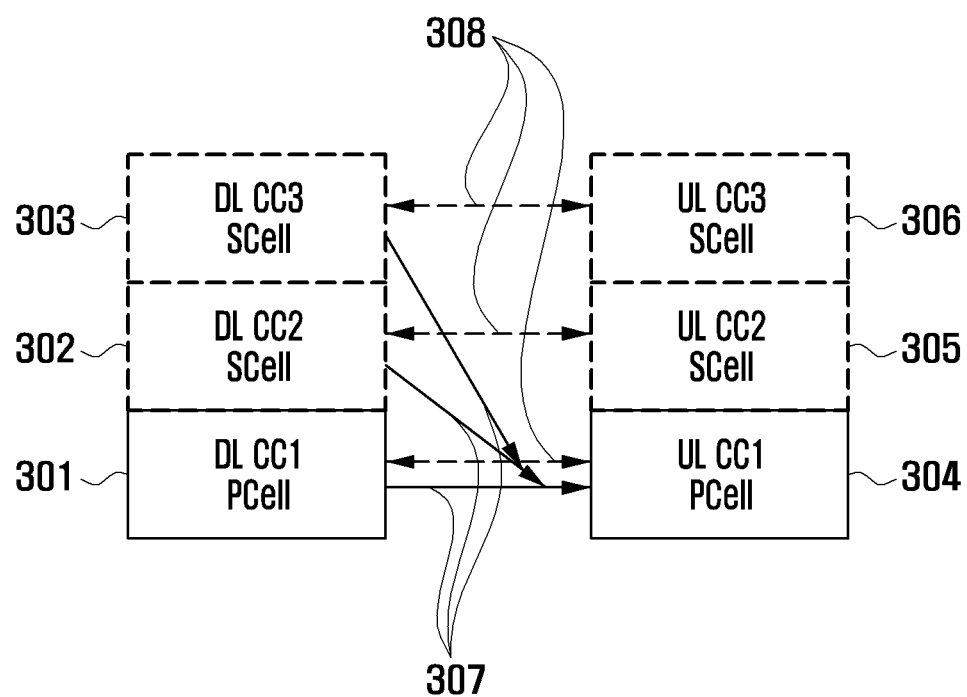
FIG. 3 is a diagram illustrating a configuration between uplink and downlink carriers in a multi-carrier system according to an embodiment of the present invention.

FIG. 3 is a diagram illustrating a configuration between uplink and downlink carriers in a multi-carrier system according to an embodiment of the present invention.

Referring to FIG. 3, a multi-carrier system according to an embodiment of the present invention may be implemented with three downlink carriers 301, 302, and 303 and three uplink carriers 304, 305, and 306. A base station transmits information regarding the multiple carriers to user equipment respectively. The information may be information regarding all of the multiple carriers, information regarding a carrier with a higher priority from among the carriers available in the respective uplink and downlink, and information regarding System Information Block-2 (SIB2) links 308 for transmitting/receiving system information between uplink and downlink carriers. When user equipment is initially connected to one downlink carrier, SIB2 link information indicates a carrier that transmits an uplink reply in response to the connection. This uplink reply is transmitted because the initial user equipment does not have information regarding the multiple carriers other than a carrier making an attempt to connection.

User equipment having completed an initial connection receives information regarding all available carriers from a base station. This information includes a set of downlink carriers and a set of uplink carriers. From among the downlink carriers and uplink carriers, each user equipment indicates a primary carrier, which is called Pcell. The others are called Scell. Therefore, the user equipment receives a downlink control channel data 307 performing a cross carrier scheduling, from a downlink Pcell 301, and data from all carriers, and transmits Physical Uplink Control CHannel (PUCCH) information regarding all data to the uplink Pcell 304. In that case, the carriers are processed by the same rule regardless of whether the carriers are adjacent to each other.

When a relay employs the scheme where the multiple carriers are applied to the user equipment as described in FIG. 3, although the relay uses a link between a base station and a relay and a link between a relay and user equipment, there may be two operation scenarios as shown FIG. 4.

FIG. 4 is a diagram illustrating scenarios for carriers in a multi-carrier relay system according to an embodiment of the present invention.

Examples 407, 408, 409, and 410 correspond to a first scenario where a relay backhauls multi-carriers via one Radio-Frequency (RF) module. In this scenario, all carriers are configured with the same backhaul sub-frame or all carriers use the successive carrier configuration. That is, all carriers are operated by only one of the same normal sub-frame and the same backhaul sub-frame over the time axis.

Reference numbers 401, 402 and 403 correspond to a base station, a relay and user equipment, respectively. In the present example, all carriers are used to transmit backhaul data at a timing point that the base station 401 transmits the backhaul data to the relay 402 as shown in diagram 407. In that case, the relay 402 does not transmit data to the user equipment 403 connected to the relay 402 as shown in diagram 409. To the contrary, although the relay 402 does not receive data at time point 408 for a usual sub-frame that the base station transmits data to the user equipment connected to the base station, the relay 402 can transmit data to the user equipment 403 connected to the relay 402 as shown in diagram 410. Since all carriers are simultaneously used as backhaul carriers with respect to the cross-carrier scheduling, as shown in diagram 407, the relay can transmit data via the cross-carrier scheduling. Since the user equipment can only receive control channel data in the manner shown in diagram 409, the user equipment may perform a corresponding operation according to the cross-carrier scheduling. However, the user equipment does not schedule the data channel. Instead, as shown in diagram 410, the relay 402 can schedule the user equipment 403, via a cross-carrier scheduling used by a general base station, as described above referring to FIG. 3. Since the user equipment recognizes the relay as a base station, backhauling by base station and a relay is achieved at time point 407.

Examples 411, 412, 413 and 414 correspond to a second scenario where a relay backhauls multi-carriers via a number of RF modules. That is, each carrier is configured with the different backhaul sub-frames. The carriers are spaced apart from each other in such a way that they cannot be operated via one RF module.

As shown in diagram 411, when the system operates three carriers, two adjacent carriers 1 and 2 can be operated via one module, while carrier 3 cannot be operated via the same module. In that case, carriers 1 and 2 are configured with the same backhaul sub-frame, and carrier 3 is required to be configured with a different backhaul sub-frame. The carriers need different backhaul sub-frames because they are used for different uses according to the frequencies. For example, since a carrier with a relatively low frequency has a relatively large coverage area, such a carrier can be used to expand the coverage of the cell. Meanwhile, since a carrier with a relatively high frequency has a relatively small coverage area, such a carrier can be used to cover a shadowing region indoors, in a basement area, or within a central city location, for example. Since carriers are used according to their types, the carriers require different backhaul capacities and these requirements lead to different configurations. Therefore, as shown in diagram 411, when carriers 1 and 2 are used as backhaul carriers, they can be processed via cross-carrier scheduling. However, carrier 3 may not be used as a backhaul carrier. In that case, the user equipment as shown in diagram 413 schedules carrier 3. Therefore, this system according to an embodiment of the present invention is advantageous in that, at a given time point, some of the carriers can be used for backhaul reception while the other carriers are used for data transmission of user equipment.

According to another example, diagram 412 shows a case where carrier 3 is used for backhaul, while carriers 1 and 2 are used for data transmission of user equipment as shown in diagram 414. This scenario can improve the conventional problem where a relay cannot simultaneously perform transmission and reception at a timing point. To this end, the relay can operate the different backhaul sub-frames between carriers.

If carriers have different backhaul sub-frames, there may be three cases as follows: First, all sub-frames are designated as backhaul sub-frames. Second, a sub-frame of a carrier set as a Pcell is designated as a backhaul sub-frame, and a sub-frame of a carrier set to Scell is designated as a normal sub-frame. Third, a sub-frame of a carrier set as a Pcell is designated as a normal sub-frame, and a sub-frame of a carrier set to Scell is designated as a backhaul sub-frame.

Figure 5:
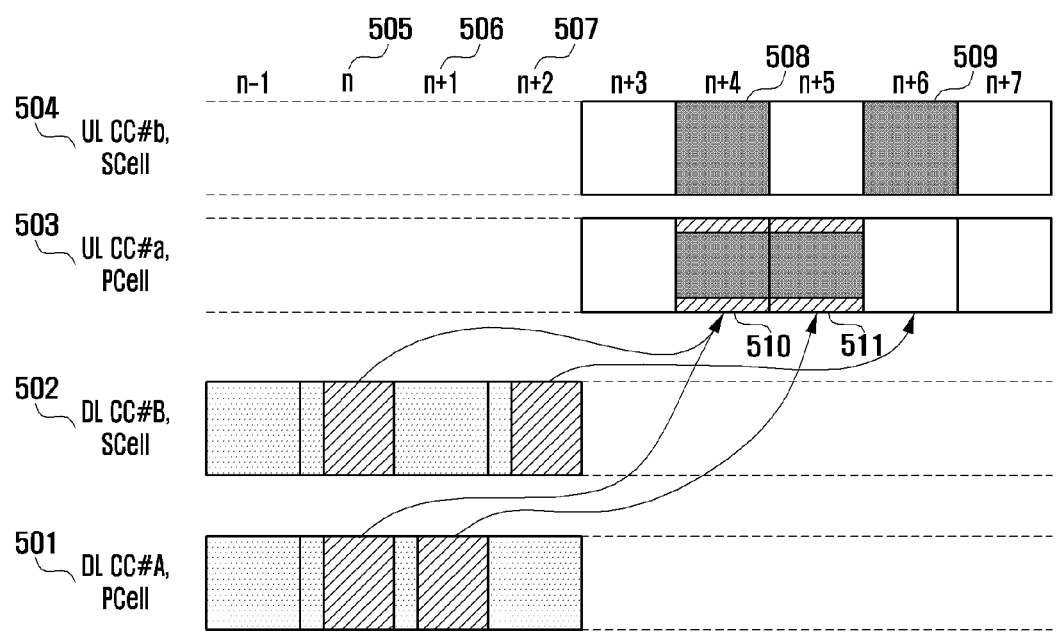
FIG. 5 is a diagram illustrating channel transmission and reception in a multi-carrier relay system according to an embodiment of the present invention.

FIG. 5 is a diagram illustrating channel transmission and reception in a multi-carrier relay system according to an embodiment of the present invention.

Referring to FIG. 5, a multi-carrier system according to an embodiment of the present invention may include a downlink carrier 501 set to Pcell, another downlink carrier 502 set to Scell, an uplink carrier 503 set to Pcell, and another uplink carrier 504 set to Scell.

The above-described first case corresponds to the $n^{th}$ sub-frame as shown in diagram 505. All downlink carriers are configured as backhaul sub-frames. Therefore, PUCCH channel data via the scheduled data channels is transmitted by the uplink Pcell as shown in diagram 510.

The second case corresponds to the $(n+1)^{th}$ sub-frame as shown in diagram 506, where Pcell is configured as a back sub-frame and Scell is configured as a normal sub-frame. The $(n+5)^{th}$ sub-frame of an uplink carrier 503 is configured as a backhaul sub-frame. PUCCH data is transmitted via a resource as shown in diagram 511.

The third case corresponds to the $(n+2)^{th}$ sub-frame as shown in diagram 507, where Pcell is configured as a normal sub-frame and Scell is configured as a backhaul sub-frame. PUCCH data, transmitted to Scell, is transmitted via Pcell 503 at a timing point of sub-frame (n+6) as shown in diagram 509. However, since a downlink Pcell 501 at a time point of a sub-frame (n+2) is a normal sub-frame, a corresponding sub-frame is transmitted via an uplink by user equipment connected to a relay. Therefore, the relay cannot transmit PUCCH data. Since a backhaul sub-frame is not included in all sub-frames, the relay cannot employ a method applied to the user equipment. In particular, if a backhaul sub-frame exists only in Scell, many problems are caused in the transmission of PUCCH data. This problem can be resolved by the following described embodiments of the present invention.

Figure 6:
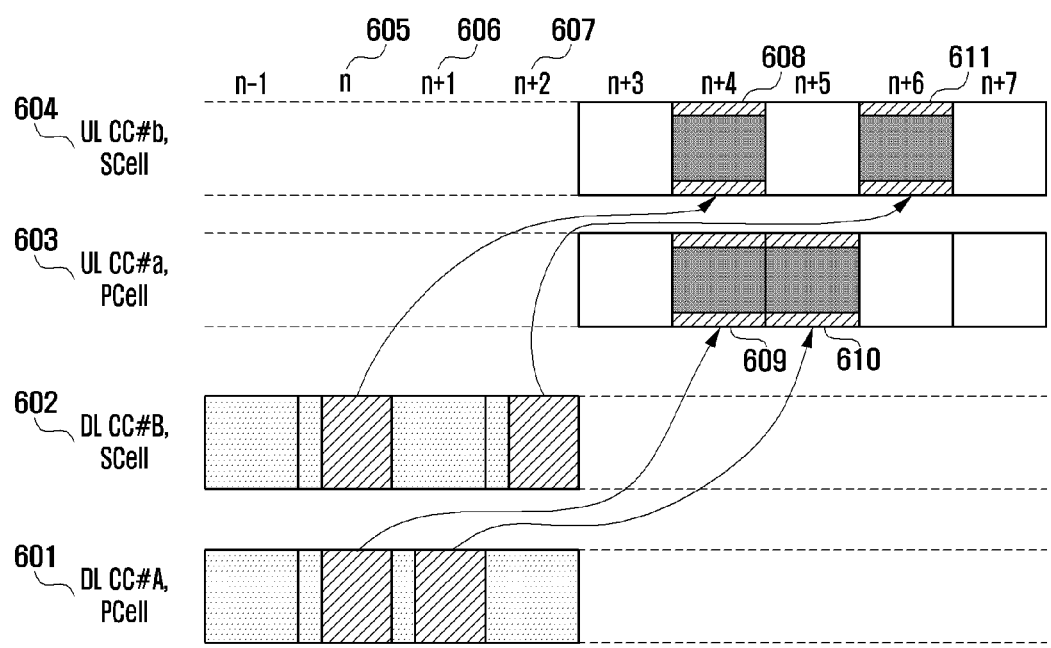
FIG. 6 is a diagram illustrating a transmission and reception relation according to an embodiment of the present invention.

FIG. 6 is a diagram illustrating an embodiment of a method for transmitting channel data via a multi-carrier backhaul, according to the present invention.

Referring to FIG. 6, the user equipment transmits PUCCH data via downlink carriers 601 and 602 that have been used to receive data and uplink carriers 603 and 604 linked to SIB2. The system defines carriers 601 and 603 as Pcells and informs a relay of the definition via upper signaling information. The system also informs the relay of an SIB2 link where carriers 601 and 603 are linked to each other and carriers 602 and 604 are linked to each other. Unlike conventional user equipment, the user equipment according to embodiments of the present invention may transmit PUCCH data, transmitted via carriers 601 and 602, via carriers 603 and 604 linked to SIB2, in the $n^{th}$ sub-frame 605. Channel data is transmitted at time point 611 where a backhaul of an uplink Pcell does not exist, by using a resource 609 with respect to the $(n+1)^{th}$ sub-frame 606, and by using a resource of an uplink Scell 604 linked to SIB2, with respect to the $(n+2)^{th}$ sub-frame 607. The system according to embodiments of the present invention can resolve the conventional problems created when a backhaul sub-frame does not exist in Pcell, by using only SIB2 link information that has been already transmitted, without additional instruction information. The embodiment according to FIG. 6 is implemented in such a way that the base station allows the relay to set resources for transmitting PUCCH data to uplink Pcell and Scell. That is, the first embodiment requires double the resources of the embodiment of FIG. 5. In addition, in the embodiment according to FIG. 6, the relay cannot transmit a single carrier via an uplink.

Figure 7:
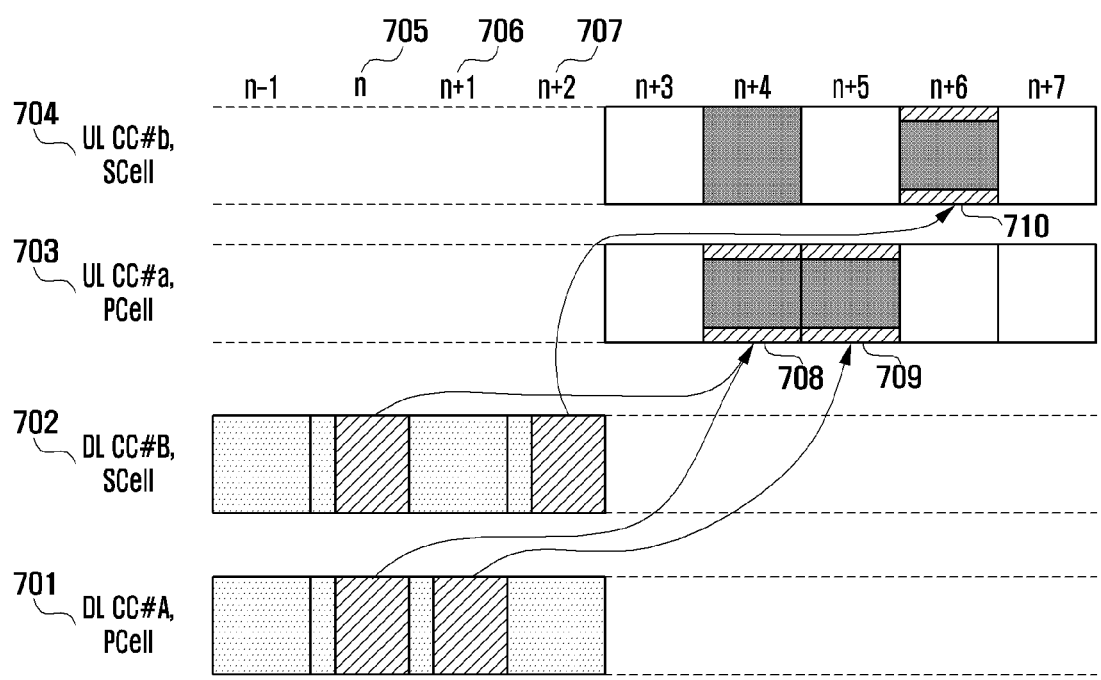
FIG. 7 is a diagram illustrating a transmission and reception relation according to another embodiment of the present invention.

FIG. 7 is a diagram illustrating another embodiment of a method for transmitting channel data via a multi-carrier backhaul, according to the present invention.

The embodiment according to FIG. 7 is implemented in such a way that: if a backhaul sub-frame exists in downlink Pcell, transmission is made using PUCCH resources in the uplink Pcell; and if a backhaul sub-frame does not exist in downlink Pcell, transmission is made by resources linked to SIB2. By contrast, according to the embodiment of FIG. 6 transmission of channel data is performed according to the types of sub-frames.

Referring to FIG. 7, the system utilizes downlink carriers 701 and 702 and uplink carriers 703 and 704. The system defines carriers 701 and 703 as Pcells and informs a relay of the definition via upper signaling information. The system also informs the relay of SIB2 link where carriers 701 and 703 are linked to each other and carriers 702 and 704 are linked to each other. In a manner similar to the operation as described with reference to FIG. 5, the system according to FIG. 7 transmits data to PUCCH resources of the uplink Pcell as shown in diagrams 708 and 709 if a backhaul sub-frame exists in a downlink Pcell 701 as shown in diagrams 705 and 706. In addition, the system can transmit PUCCH data to an uplink Scell 701 linked to SIB2 as shown in diagram 710 although a backhaul sub-frame doesn't exist in Pcell as shown in diagram 707. Since, unlike the embodiment according to FIG. 6, the embodiment according to FIG. 7 does not use PUCCH resources in all Scells, the embodiment according to FIG. 7 can further reduce the amount of resources used. In addition, if a backhaul sub-frame exists in Pcell, a base station can retain transmission of single carriers when transmitting PUCCH data. If a backhaul sub-frame does not exist in Pcell, a base station cannot transmit a single carrier. Therefore, the embodiment according to FIG. 7 can minimize the problems that occur when a single carrier is not transmitted.

Figure 8:
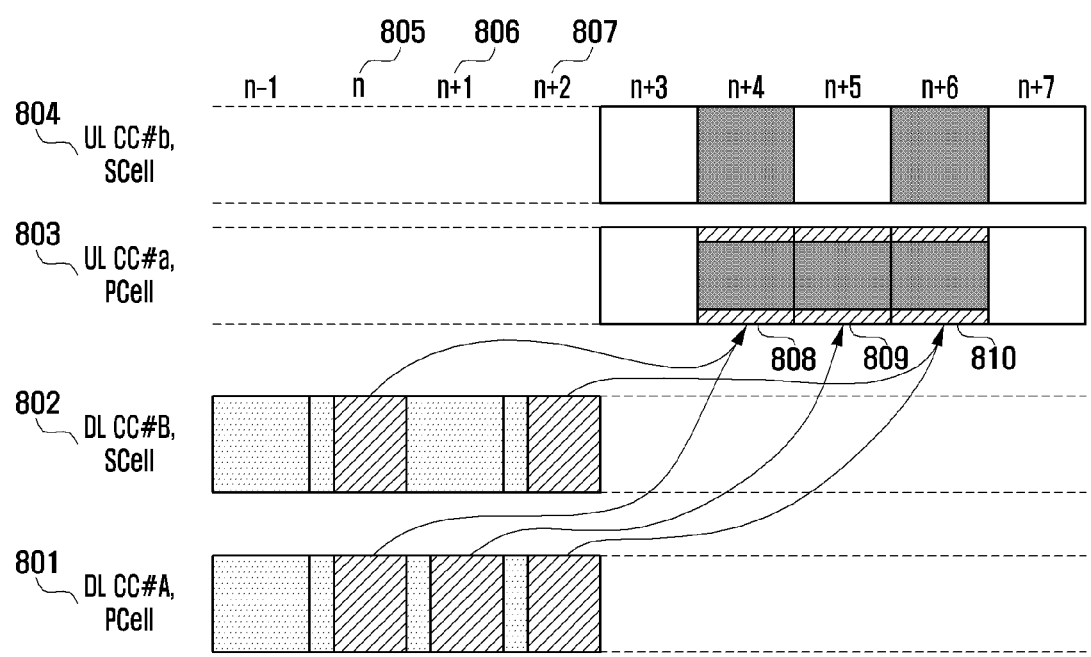
FIG. 8 is a diagram illustrating a transmission and reception relation according to yet another embodiment of the present invention.

FIG. 8 is a diagram illustrating another embodiment of a method for transmitting channel data via a multi-carrier backhaul, according to the present invention.

Referring to FIG. 8, the method of FIG. 8 is for configuring a backhaul sub-frame to avoid the problems that may occur in the method described with reference to FIG. 5. In the embodiment according to FIG. 8, the base station indicates, as a Pcell, a carrier with a high rate in a backhaul sub-frame of a relay, and a backhaul sub-frame of Scell is configured as a subset of backhaul sub-frame configuration in Pcell.

Referring to the system of FIG. 8 utilizes downlink carriers 801 and 802 and uplink carriers 803 and 804. The system defines carriers 801 and 803 as Pcells and informs a relay of the definition via upper signaling information. The system also informs the relay of SIB2 link where carriers 801 and 803 are linked to each other and carriers 802 and 804 are linked to each other. In order to prevent a case where a backhaul sub-frame of Pcell does not exist, the base station sets a carrier with the largest number of backhaul frames as Pcells in a relay, and enforces a backhaul of Scell to be configured as a subset of Pcell. Referring to timing points 805, 806, and 807, the $n^{th}$, $(n+1)^{th}$ and $(n+2)^{th}$ sub-frames are set backhaul sub-frames and the carriers are designated as Pcells, an Scell as shown in diagram 802 can prevent a problem that occurs when a backhaul does not exist in a sub-frame of uplink Pcell at a time point when the subset of the configuration of Scell configures the $n^{th}$ and $(n+2)^{th}$ sub-frames as backhaul sub-frames and uplink PUCCH data is transmitted. In that case, although the system according to embodiments of the present invention is advantageous in that the system may use the method of FIG. 5, applied to conventional user equipment, such a method may be disadvantageous in that the method reduces the degree of freedom in a backhaul configuration of each carrier.

Figure 9:
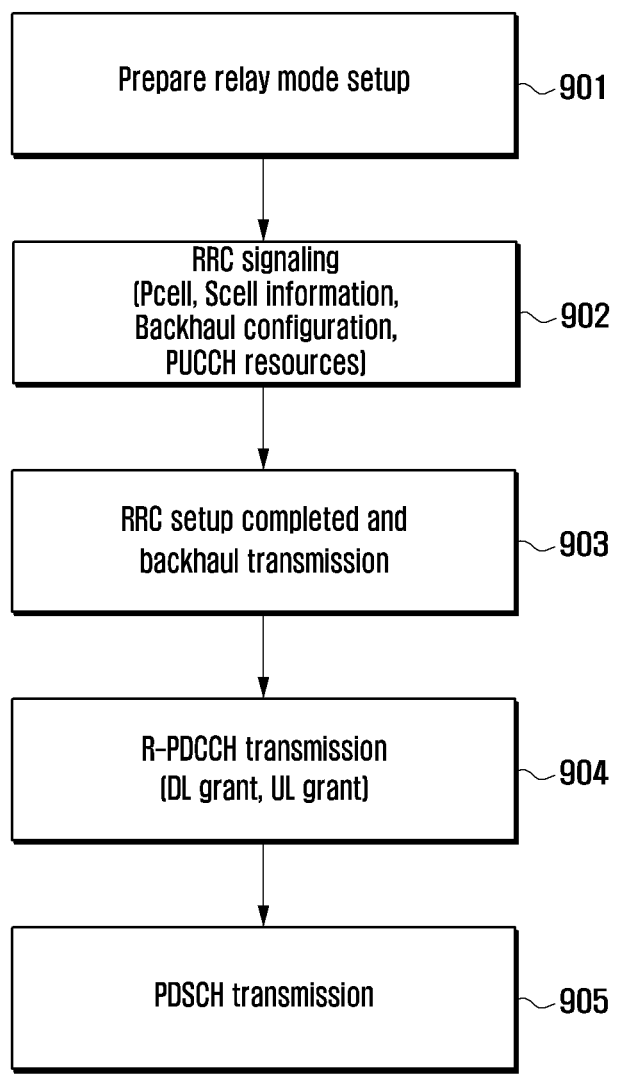
FIG. 9 is a flow chart illustrating a transmission method of a base station according to an embodiment of the present invention.

FIG. 9 is a flow chart illustrating a transmission method of a base station according to an embodiment of the present invention.

Referring to FIG. 9, when a system includes a relay, the base station prepares a Radio Resource Control (RRC) connection, in step 901. The base station configures downlink carriers from among multiple carriers as at least one normal sub-frame and at least one backhaul sub-frame. The base station determines, as a Pcell, one of the downlink carriers that has the maximum number of backhaul sub-frames, and also determines the other carriers as Scells. In addition, the base station alters part of backhaul sub-frames to normal sub-frames in Scell so that the sub-frames belong to a subset of Pcell. The base station can transmit link information regarding the downlink carriers and the uplink carriers via downlink carriers, respectively.

The base station transmits information regarding RRC configuration to a relay, in step 902. More specifically, when the base station receives an RRC connection request message from a relay, the base station can transmit RRC configuration information to the relay. The RRC configuration information includes: multi-carrier information that indicates downlink carriers and uplink carriers via a Pcell or an Scell; backhaul configuration information that represents the configuration of backhaul sub-frames and normal sub-frames of the respective downlink carriers; and uplink reply channel information that indicates a reply carrier via one of the uplink carriers in response to the respective downlink carriers. When a backhaul sub-frame is configured in an Scell in response to the same timing point as a normal sub-frame of a Pcell in downlink carriers, the reply carrier can be selected from among the uplink carriers according to link information. However, when a backhaul sub-frame is configured in Pcell in response to a particular timing point in downlink carriers, the reply carrier can be selected, as a Pcell, from among the uplink carriers.

The base station has completed RRC setup with a relay and transmits a backhaul sub-frame to the relay, in step 903. The base station transmits control information for controlling the relay via a Reverse Packet Data Control CHannel (R-PDCCH), in step 904. The base station transmits channel data via a data channel indicated by the control information of step 904, in step 905.

Figure 10:
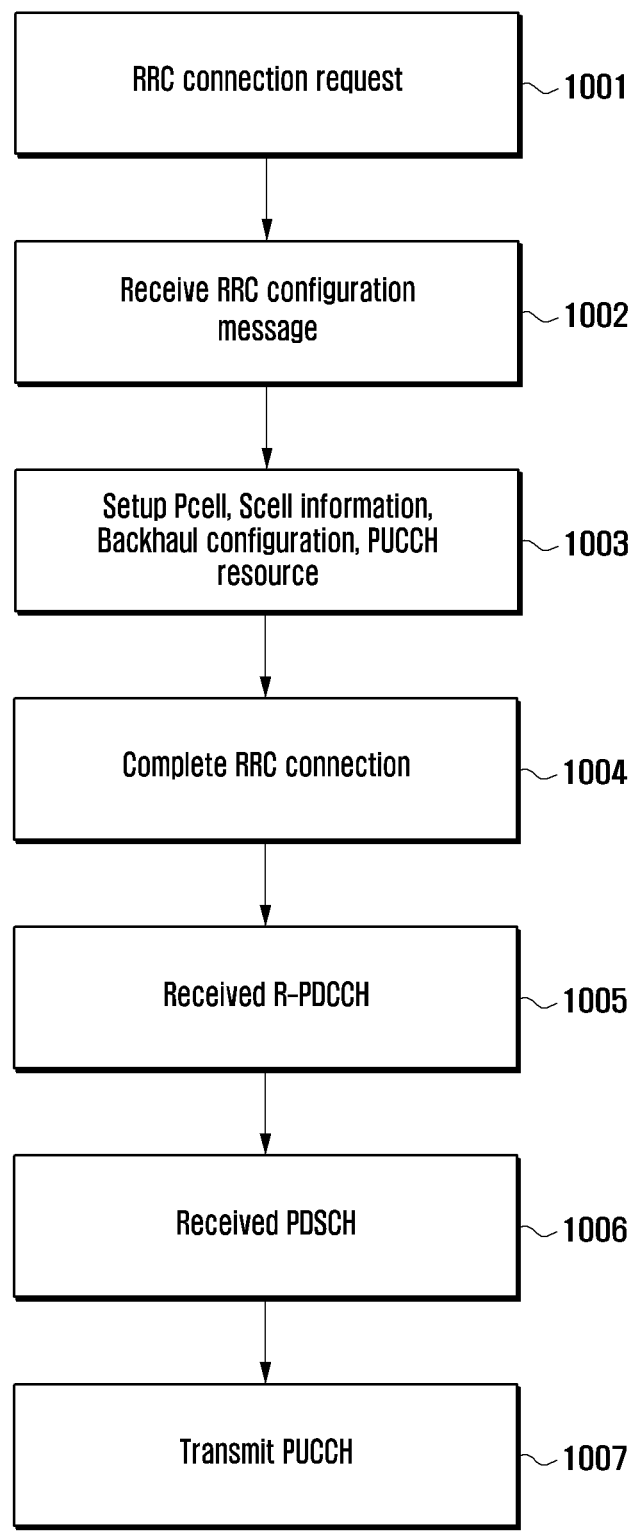
FIG. 10 is a flow chart illustrating a transmission method of a relay according to an embodiment of the present invention.

FIG. 10 is a flow chart illustrating a transmission method of a relay according to an embodiment of the present invention.

Referring to FIG. 10, a relay initially operates as user equipment with respect to the base station. While operating as a user equipment, the relay receives link information regarding the respective uplink carriers and the respective downlink carriers via the downlink carriers. The relay transmits an RRC connection request message to the base station, in step 1001. The relay receives the RRC configuration information from the base station, in step 1002. The RRC configuration information includes: multi-carrier information that indicates downlink carriers and uplink carriers via Pcell or Scell; backhaul configuration information that represents the configuration of backhaul sub-frames and normal sub-frames of the respective downlink carriers; and uplink reply channel information that indicates a reply carrier via one of the uplink carriers in response to the respective downlink carriers.

The relay sets up Pcell and Scell in downlink carriers and uplink carriers using the RRC configuration information, in step 1003. Pcell may be set to have the maximum number of backhaul sub-frames in the downlink carriers. In response to setting of the normal sub-frames of Pcell, Scell may be set as a subset of Pcell where the normal sub-frames are arranged. The relay sets the configuration of backhaul sub-frames and normal sub-frames in the downlink carriers. The relay may also configure a reply carrier for an uplink reply channel as one of the uplink carriers, in response to the respective downlink carriers. When backhaul sub-frames are configured in Scell at the same time as a normal sub-frame of Pcell in the downlink carriers, the reply carrier may be selected from among the uplink carriers according to the link information. However, when backhaul sub-frames are configured in Pcell at a timing point in the downlink carriers, the reply carrier may be selected, as a Pcell, from among the uplink carriers.

The relay completes an RRC connection, in step 1004. The relay subsequently stops operating as user equipment and then operates as a relay. The relay receives the control channel data via the backhaul sub-frames of downlink carriers, in step 1005. The relay receives channel data via the backhaul sub-frames of a corresponding downlink carrier using scheduling information included the received control channel data, in step 1006. The relay transmits, to one or more resources, the control information that is created in response to a backhaul sub-frame in a reply carrier corresponding to a backhaul sub-frame through which the received channel data is transmitted, in step 1007.

Figure 11:
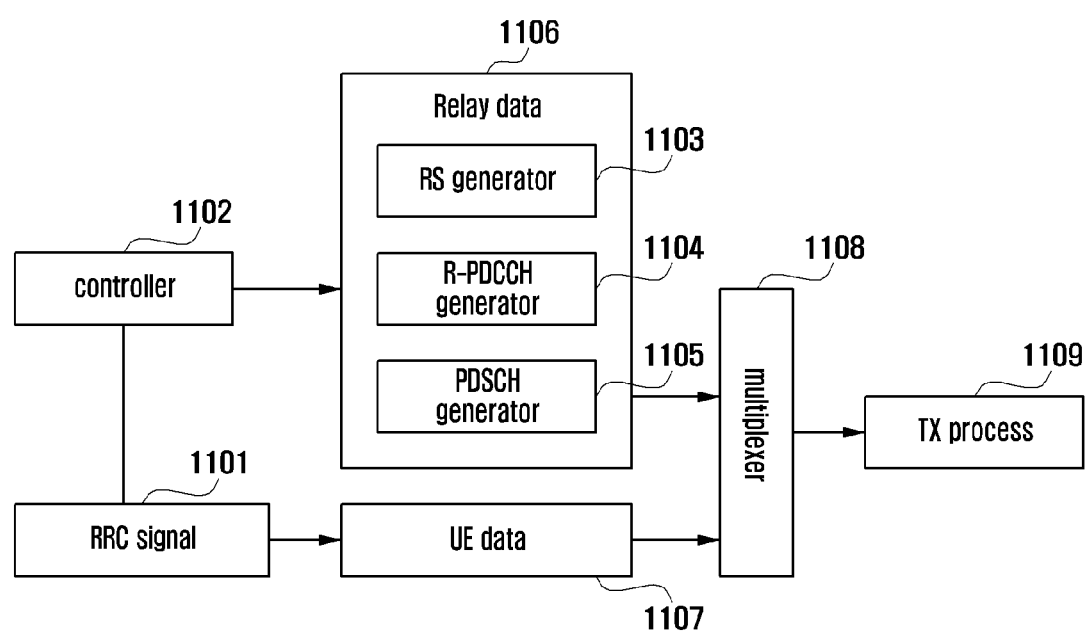
FIG. 11 is a schematic block diagram illustrating a base station according to an embodiment of the present invention.

FIG. 11 is a schematic block diagram of a base station according to an embodiment of the present invention.

Referring to FIG. 11, the base station includes a scheduler and controller 1102, an RS generator 1103, an R-PDCCH generator 1104, a Physical Downlink Shared CHannel (PDSCH) generator 1105, a multiplexer 1108, and a transmitter 1109. The base station creates relay data 1106, user equipment data 1107, and an RRC signal 1101.

The scheduler and controller 1102 creates an RRC signal 1101 serving as upper signaling information for a relay, multiplexes the RRC signal 1101 with the user equipment data 1107, and transmits the multiplexed information. At the same time, the scheduler and controller 1102 creates relay data 1106 in a relay having completed an RRC connection. The relay data 1106 includes: an RS signal for a relay created via the RS generator 1103; a control channel signal created via the R-PDCCH generator 1104; and channel data created via the PDSCH generator 1105. The multiplexer 1108 multiplexes the relay data 1106 and user equipment data 1107 and transmits the multiplexed data, i.e., the transmitter 1109 transmits the relay data and user equipment data via downlink carriers of multi-carriers.

The scheduler and controller 1102 includes a configuring unit and a controller (not shown). The configuring unit configures each of the downlink carriers as at least one normal sub-frame and at least one backhaul sub-frame. The controller determines one of the downlink carriers as a Pcell, and the others as Scells. The controller determines, as a Pcell, one of the downlink carriers that has the maximum number of backhaul sub-frames, and alters a backhaul sub-frame to a normal sub-frame in Scell, in response to a normal sub-frame in Pcell. In addition, the controller transmits link information regarding respective downlink carriers and respective uplink carriers via the respective downlink carriers. When connecting to a relay using the link information, the controller transmits the RRC configuration information.

Figure 12:
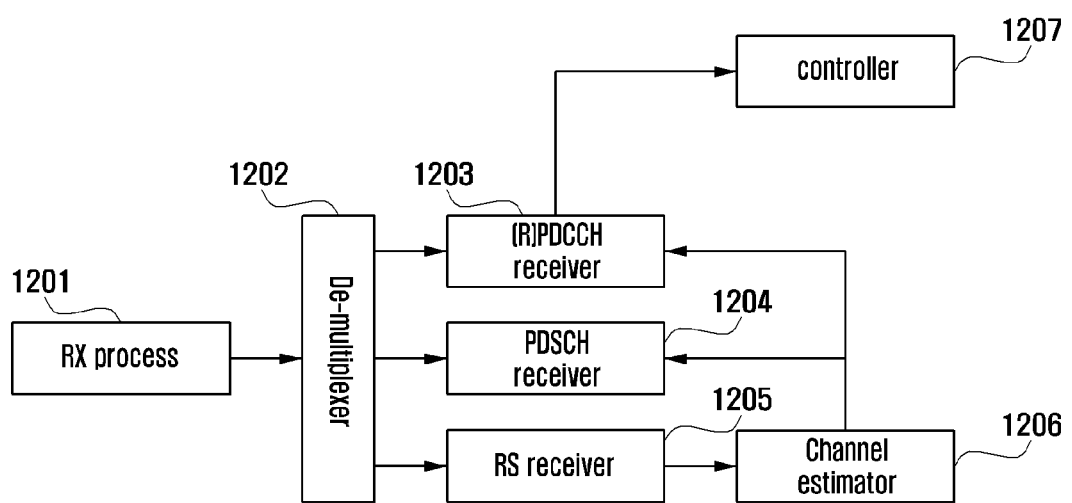
FIG. 12 is a schematic block diagram illustrating a relay according to an embodiment of the present invention.

FIG. 12 is a schematic block diagram illustrating a relay according to an embodiment of the present invention.

Referring to FIG. 12, the relay includes an RS signal receiver 1201, a de-multiplexer 1202, an R-PDCCH receiver 1203, a PDSCH receiver 1204, an RS receiver 1205, a channel estimator 1206, and a scheduler and controller 1207.

The RS signal receiver 1201 receives signals from the base station, via downlink carriers of multi-carriers. The downlink carriers are each configured with at least one normal sub-frame and at least one backhaul sub-frame. The de-multiplexer 1202 de-multiplexes the input signals into corresponding signals according to channels, i.e., RS, PDCCH, R-PDCCH, and PDSCH. The RS receiver 1205 measures the channel states via RS, transmits the channel information regarding the RS to the channel estimator 1206, and receives the other channel data. In order to receive PDCCH or R-PDCCH data, the relay acquires information regarding a control channel via the R-PDCCH receiver 1203. The scheduler and controller 1207 receives channel data using the control channel information via the PDSCH receiver 1204. Before the relay registers as a relay in the base station, the base station receives PDCCH data, and performs an RRC connection, operating as user equipment. After that the registration, the relay operates as a relay and receives the R-PDCCH.

The scheduler and controller 1207 includes a controller and a transmitter (not shown). The controller receives link information regarding respective downlink carriers and respective uplink carriers via the respective downlink carriers. The controller accesses the base station using the link information. The controller receives the RRC configuration information from the base station. The controller determines one of the downlink carriers as a Pcell, and the others as Scells. Pcell has the maximum number of backhaul sub-frames in the downlink carriers. Scell may be configured as a subset of Pcell where normal sub-frames are arranged in response to a normal sub-frame of Pcell. The controller selects a reply carrier in the uplink carriers in response to respective downlink carriers. The transmitter transmits control information that is created in response to a backhaul sub-frame via the reply carrier under the control of the controller.

As described above, since systems and methods according to embodiments of the present invention allow a relay to perform channel transmission of multiple carriers in backhaul sub-frames, a base station can perform uplink link channel transmission due to the transmission of multi-carriers regardless of whether the backhaul sub-frames between the carriers applied to the relay are the same.

Although embodiments of the invention have been described in detail hereinabove, it should be understood that many variations and modifications of the basic inventive concept herein described, which may be apparent to those skilled in the art, will still fall within the spirit and scope of the present invention as defined in the appended claims.

What is claimed is:

1. A method performed by a base station for communicating via multi-carriers, the method comprising:
    configuring each of downlink carriers that form the multi-carriers as at least one normal sub-frame and at least one backhaul sub-frame;
    determining one of the downlink carriers that has a maximum number of backhaul sub-frames, as a primary carrier, and other downlink carriers as sub-carriers; and
    altering a backhaul sub-frame into a normal sub-frame in the sub-carrier, in response to a normal sub-frame of the primary carrier,
    wherein the backhaul sub-frame is for communication between a relay and the base station.

2. The method of claim 1, further comprising:
    transmitting link information regarding the downlink carriers and the uplink carriers via respective downlink carriers; and
    selecting if connecting to the relay using the link information, a reply carrier for receiving control information, created in response to the backhaul sub-frame in the relay, from the uplink carriers, and transmitting configuration information indicating the reply carrier.

3. The method of claim 2, wherein the reply carrier is selected from the uplink carriers according to the link information if a backhaul frame is configured in the sub-carrier at the same time as a normal sub-frame of the primary carrier.

4. The method of claim 2, wherein the reply carrier is selected as a primary carrier corresponding to one of the uplink carriers if a backhaul frame is configured in the primary carrier at a timing point in the downlink carriers.

5. A method performed a relay for communicating via multi-carriers, the method comprising:
    determining one of downlink carriers as a primary carrier, and other downlink carriers as sub-carriers, where the downlink carriers form the multi-carriers and each downlink carrier is configured as at least one normal sub-frame and at least one backhaul sub-frame;
    selecting if a backhaul sub-frame is configured in the downlink carriers, one of uplink carriers as a reply carrier, and transmitting control information that is created in response to the backhaul sub-frame,
    wherein the primary carrier has a maximum number of backhaul sub-frames in the downlink carriers,
    wherein the backhaul sub-frame is for communication between the relay and a base station, and
    wherein the sub-carriers are configured as a subset of the primary carrier where normal sub-frames are arranged in response to the at least one normal sub-frame of the primary carrier.

6. The method of claim 5, further comprising:
    receiving link information regarding the downlink carriers and the uplink carriers via respective downlink carriers; and
    indicating if connecting to the base station using the link information, the respective downlink carriers via the primary carrier or sub-carriers, and receiving configuration information for indicating the reply carrier in response to the respective downlink carriers from the uplink carriers.

7. The method of claim 6, wherein the reply carrier is selected from the uplink carriers according to the link information if a backhaul frame is configured in the sub-carrier at the same time as a normal sub-frame of the primary carrier.

8. The method of claim 6, wherein the reply carrier is selected as a primary carrier corresponding to one of the uplink carriers if a backhaul frame is configured in the primary carrier in the downlink carriers.

9. A base station for communicating via multi-carriers, the base station comprising:
    a transmitter for transmitting signals via the multi-carriers of downlink carriers;
    a configuring unit for configuring each of the downlink carriers as at least one normal sub-frame and at least one backhaul sub-frame; and
    a controller for determining one of the downlink carriers that has a maximum number of backhaul sub-frames, as a primary carrier, and other downlink carriers as sub-carriers, and for altering a backhaul sub-frame into a normal sub-frame in the sub-carrier, in response to a normal sub-frame of the primary carrier,
    wherein the backhaul sub-frame is for communication between a relay and the base station.

10. The base station of claim 9, wherein the controller transmits link information regarding the downlink carriers and uplink carriers via the respective downlink carriers, and selects if connecting to the relay using the link information, a reply carrier for receiving control information, created in response to the backhaul sub-frame in the relay, from the uplink carriers, and transmits configuration information indicating the reply carrier.

11. The base station of claim 10, wherein the reply carrier is selected from the uplink carriers according to the link information if a backhaul frame is configured in the sub-carrier at the same time as a normal sub-frame of the primary carrier.

12. The base station of claim 10, wherein the reply carrier is selected as a primary carrier corresponding to one of the uplink carriers if a backhaul sub-frame is configured in the primary carrier in the downlink carriers.

13. A relay for communicating via multi-carriers, the relay comprising:
    a receiver for receiving signals via downlink carriers that form the multi-carriers, where each downlink carrier is configured as at least one normal sub-frame and at least one backhaul sub-frame;
    a controller for determining one of the downlink carriers as a primary carrier and the others as sub-carriers, and for selecting one of uplink carriers as a reply carrier in response to respective downlink carriers; and
    a transmitter for transmitting control information that is created in response to the backhaul sub-frame, via the reply carrier, under the control of the controller,
    wherein the primary carrier has a maximum number of backhaul sub-frames in the downlink carriers,
    wherein the backhaul sub-frame is for communication between the relay and a base station, and wherein the sub-carriers is configured as a subset of the primary carrier where normal sub-frames are arranged in response to the normal sub-frame of the primary carrier.

14. The relay of claim 13, wherein the controller receives link information regarding the downlink carriers and the uplink carriers via the respective downlink carriers, and indicates if connecting to a base station using the link information, the respective downlink carriers via the primary carrier or sub-carriers, and receives configuration information for indicating the reply carrier in response to the respective downlink carriers from the uplink carriers.

15. The relay of claim 14, wherein the reply carrier is selected from the uplink carriers according to the link information if a backhaul frame is configured in the sub-carrier at the same time as a normal sub-frame of the primary carrier.

16. The relay of claim 14, wherein the reply carrier is selected as a primary carrier corresponding to one of the uplink carriers if a backhaul frame is configured in the primary carrier in the downlink carriers.

\* \* \* \* \*